INVENTOR.
JOHN L. ROBINSON
BY
Herbert Epstein
AGENT

INVENTOR.
JOHN L. ROBINSON
BY
Herbert Epstein
AGENT

INVENTOR.
JOHN L. ROBINSON
BY
Herbert Epstein
AGENT

United States Patent Office
3,114,053
Patented Dec. 10, 1963

3,114,053

SWITCHING SYSTEM FOR CURRENT-SWITCHING TRANSISTOR MULTIVIBRATOR

John L. Robinson, Wenonah, N.J., assignor, by mesne assignments, to Philco Corporation, Philadelphia, Pa., a corporation of Delaware Filed July 5, 1960, Ser. No. 40,741
7 Claims. (Cl. 307—88.5)

Figure 1:
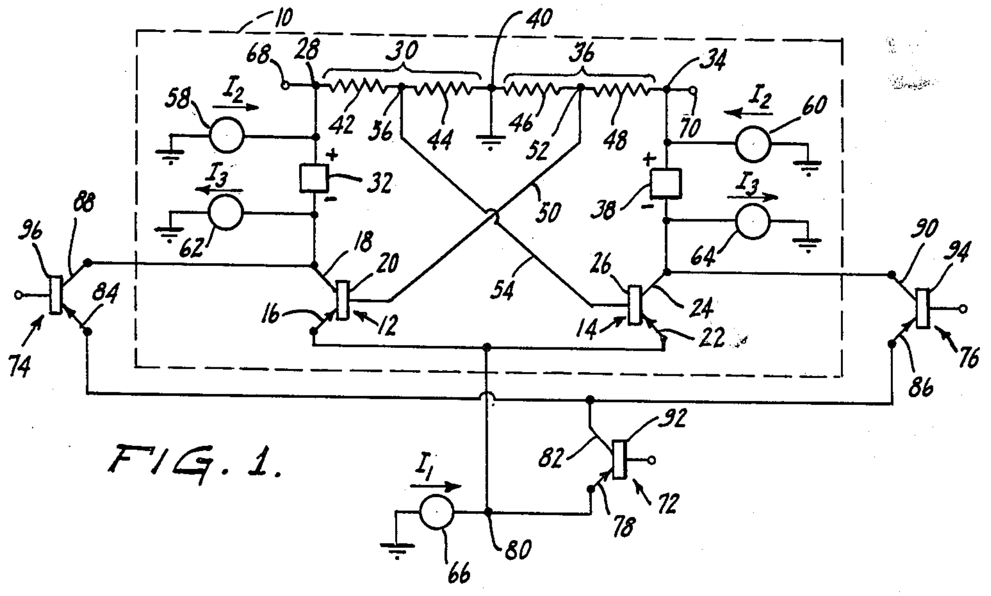

This invention relates to a system for actuating a current-switching transistor multivibrator from its initial conduction state to its alternate conduction state in response to a plurality of concurrent control signals supplied thereto, and to current-switching multivibrators embodying such a switching system.

In his paper "Millimicrosecond Transistor Current Switching Circuits" (IRE Transactions on Circuit Theory, Vol. CT–4, No. 3, pages 236 to 240, September 1957), H. S. Yourke describes at pages 239 and 240 (FIGURE 12) a bistable multivibrator employing two cross-coupled multivibrator transistors, which can be switched between its initial and alternate conduction states at unusually high rates while concurrently producing output signals of substantial amplitudes. The high switching rates are obtained by always operating the multivibrator transistors under non-saturating conditions so that the delay occasioned by minority-carrier storage is minimized. The output voltages of the multivibrator are varied over substantial amplitudes by switching, from one collector load to the other, a constant current of substantial intensity supplied to the emitters of both multivibrator transistors. Thus in the Yourke "current-switching" multivibrator, the multivibrator transistors function substantially as toggle switches; the potentials at their electrodes have little influence on the values of the output voltages and hence need only be varied through the small amplitudes sufficient to switch reliably the constant current supplied to their emitters.

To permit reversal of the respective conduction states of the two multivibrator transistors, the Yourke circuit comprises a pair of switching transistors (termed "pull-over transistors" by Yourke). The emitter and collector of each of these transistors are respectively connected to the emitter and collector of a multivibrator transistor. Reversal of the conduction states of the multivibrator transistors is effected by applying a forward-biasing voltage between the base and emitter of the switching transistor connected to the non-conductive multivibrator transistor. This forward-biasing voltage alters the emitter potential of the initially-conductive transistor to a value which cuts it off. In addition the latter switching transistor, rendered conductive by the forward-biasing voltage, diverts the constant current supplied to the emitters of the multivibrator transistors from the initially-conductive multivibrator transistor and its load into the load of the initially non-conductive multivibrator transistor. This diversion of current produces a voltage in the latter load which is supplied to the base of the initially conductive transistor to maintain it cut off. The cutting off of the latter transistor in turn permits externally supplied currents to flow through its load and produce a voltage thereacross. This voltage is supplied to the base of the initially non-conductive transistor to turn it on immediately upon removal of the forward-biasing voltage from the switching transistor. Because of this cross-supplying of load voltages, the multivibrator transistors maintain their new conductive states after the forward-biasing control voltage is removed.

The aforedescribed switching system of Yourke is responsive to a single control voltage to effect reversal of the conduction state of the multivibrator. However in computers employing multivibrators, it is frequently necessary that the multivibrator be conditioned to reverse its conduction state only in response to two or more concurrently supplied control signals. Heretofore such operation has been obtained with the Yourke multivibrator by employing a relatively complicated switching system employing at least six transistors. In particular it has been customary to supply the two control signals to the inputs of a current-switching "and" gate and to supply the output signal of the gate to the base of a Yourke pull-over transistor. One such "and" gate is required for each pull-over transistor. Normally each "and" gate comprises at least two transistors connected in parallel relationship. Accordingly at least six switching transistors are required in this prior-art arrangement for reversing the conduction state of the current-switching multivibrator in response to two concurrent control signals. Because transistors are expensive, such a switching system is costly. Moreover this switching system is disadvantageous because it is inherently relatively slow-operating. This slow operation comes about because the load current of the "and" gate must first be turned on, thereby to develop an output signal, and only thereafter can this output signal turn on the load current of the pull-over transistors.

Accordingly it is an object of the invention to provide a novel switching system for a current-switching transistor multivibrator.

Another object is to provide a switching system for a current-switching multivibrator, which is responsive to a plurality of concurrent control signals rapidly to switch the multivibrator from one conductive state to the other.

Another object is to provide such a switching system responsive to two concurrent control signals, which requires only three transistors.

Another object is to provide a switching system responsive to a plurality of concurrent control signals to reverse the conduction state of a current-switching transistor multivibrator, which operates more rapidly than prior-art switching systems.

Another object is to provide a current-switching transistor multivibrator responsive to two concurrent control signals to be switched from one conductive state to the other, which multivibrator is cheaper than prior-art current-switching transistor multivibrators performing the same function because it requires fewer transistors than the latter circuits, but which nontheless operates even more rapidly than these prior-art multivibrators.

In accordance with the invention the foregoing objects are achieved, in a current-switching transistor multivibrator comprising two transistors and means for maintaining one of these transistors substantially non-conductive while the other transistor conducts, by a novel switching system. This system comprises a current source having one terminal thereof connected to a point at reference potential and the other terminal thereof connected to the emitters of both transistors. In addition it comprises first, second and third switching means, each having two terminals and each controllable to establish between its two terminals an electrically conductive path. One terminal of the first switching means is connected to said other terminal of the current source. The other terminal of the first switching means is connected to one terminal of each of the second and third switching means. The other terminal of the second switching means is connected to the collector of one transistor and the other terminal of the third switching means is connected to the collector of the other transistor. To switch the multivibrator from one conduction state to the other, the first switching means and the switching means connected to the non-conductive transistor are so controlled that they concurrently are enabled to conduct current between their respective terminals. When this is done the current from the source is diverted into the load of the initially non-conductive transistor. As a result the conduction state of the multivibrator is reversed in the manner described above. Because the first switching means is connected in series relationship with each of the other switching means, only one current need be switched, i.e. that flowing from the current source into the initially-conductive multivibrator transistor. As a result the switching system operates substantially more rapidly than those systems in which two currents must be sequentially switched. In addition since only three switches rather than six switches are required, my system is much more inexpensive and reliable than the more complex systems of the prior art.

In the preferred emboidment of the invention, each of the three switching means comprises a transistor. The emitter of one of the three switching transistors is connected to the junction of the current source and the emitters of the two multivibrator transistors. Its collector is connected to the emitters of the other two switching transistors, and the collectors of the latter two transistors are respectively connected to the collectors of the two multivibrator transistors. In such an arrangement, switching of the emitter-collector current of the multivibrator from one multivibrator transistor to the other is achieved by simultaneously applying forward biasing potentials to the bases of said one switching transistor and the switching transistor connected to the non-conductive multivibrator transistor.

The base of the conductive multivibrator transistor is forward-biased by a potential differing only slightly from reference potential and the base-emitter potential difference of this transistor is small. Therefore the potential of its emitter and the emitters of the other multivibrator transistor and said one switching transistor also differs only slightly from reference potential. As a result only a small forward-biasing switching voltage need be applied to the switching transistors to reverse the conduction state of the multivibrator. This cooperation between the switching and multivibrator circuits is unique to the present arrangement and is an important feature of the invention.

Figure 2:
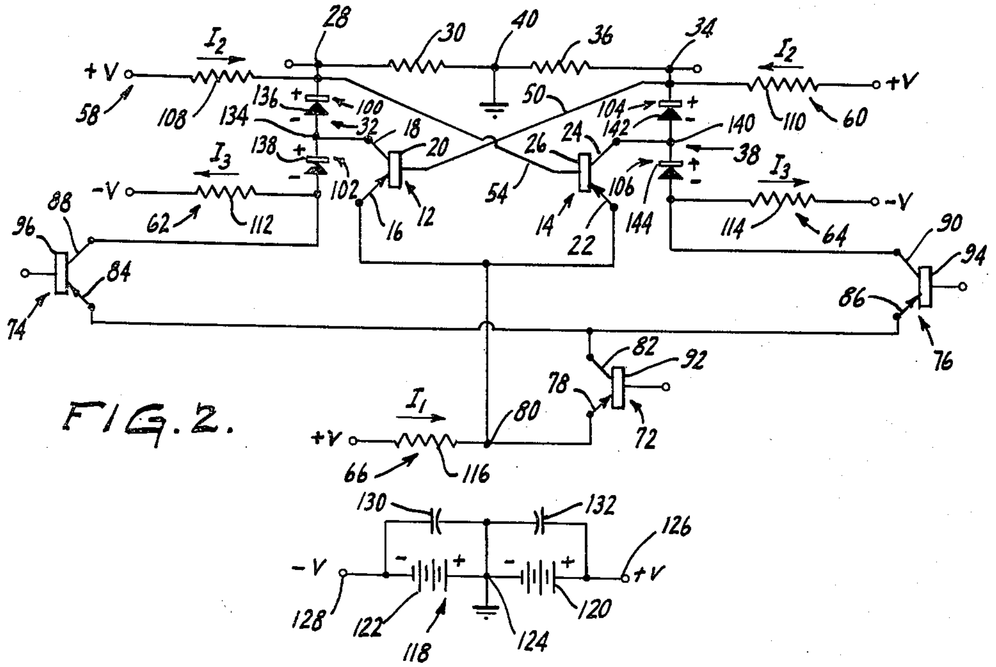
Figure 3:
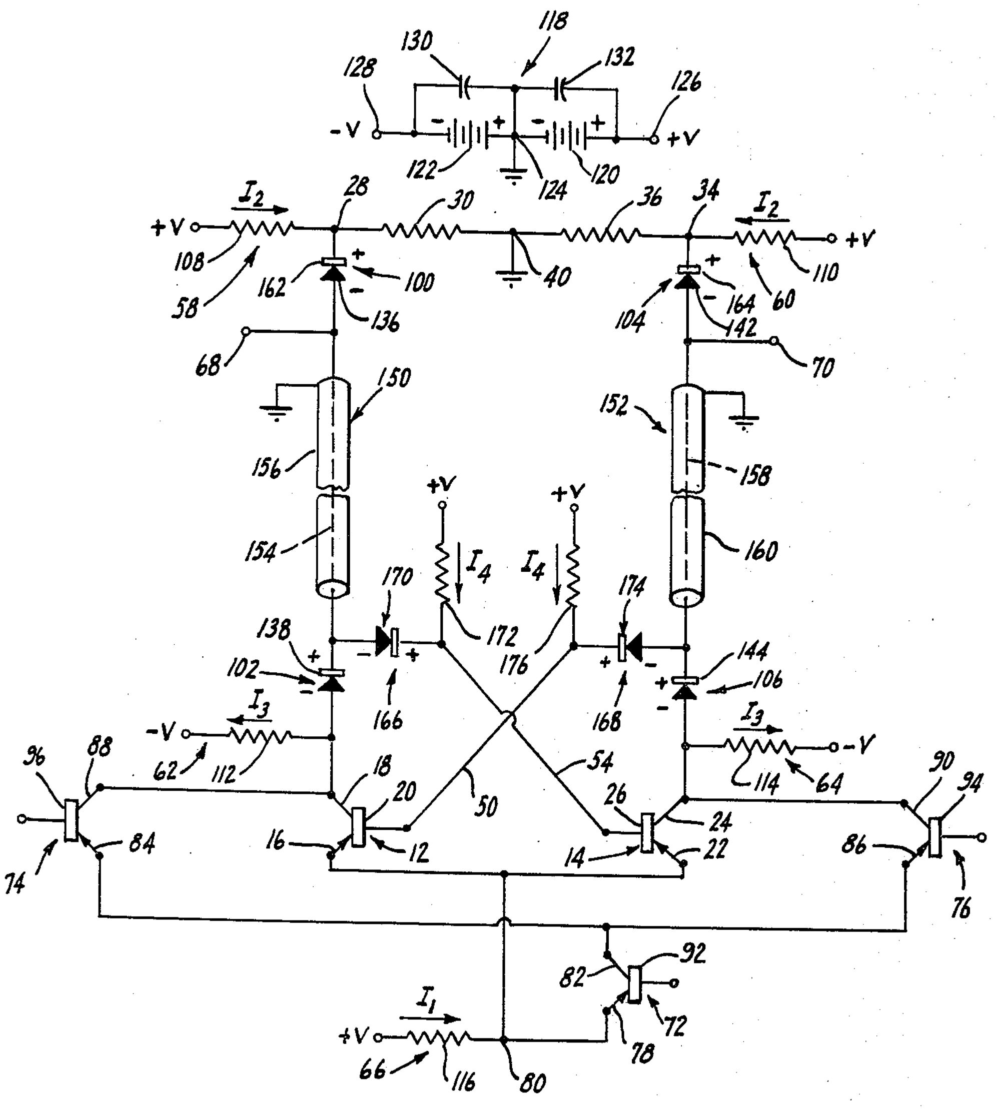
Figure 4:
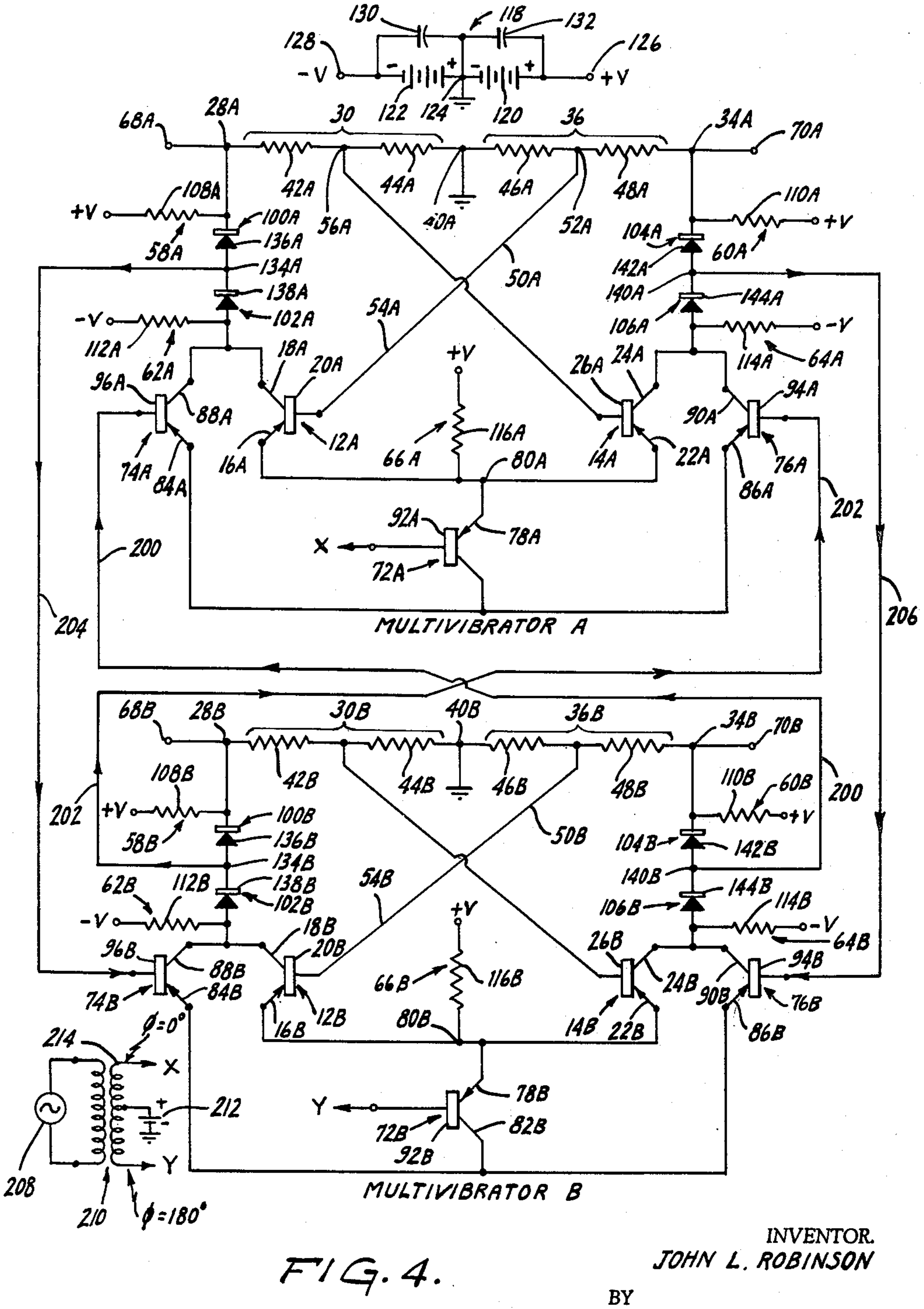

Other advantages and features of the invention will be apparent from the following detailed description of several embodiments thereof. In the accompanying drawings, FIGURES 1, 2 and 3 are schematic diagrams of multivibrators according to the invention, and FIGURE 4 is a schematic diagram of a two-count ring counter employing two multivibrators according to the invention.

FIGURE 1 illustrates schematically a preferred embodiment of the multivibrator and switching system according to the invention. In this figure, box 10 encloses those circuit elements of the multivibrator which may be the same as elements of the above-mentioned Yourke paper. These elements include first and second multivibrator transistors 12 and 14 whose bases 20 and 26 have the same conductivity type, e.g. n-type. Typically these are high-frequency transistors, e.g. microalloy, microalloy diffused-base, surface-barrier or mesa transistors. To prevent saturation of transistors 12 and 14, voltage-translating means 32 and 38 are provided. Each may comprise a Zener diode or a plurality of series-connected Zener diodes poled so as to develop a reverse-biasing potential.

To develop an output signal, load elements 30 and 36 and current sources 58, 60, 62, 64 and 66 are provided. Each of these current sources may comprise a voltage source connected in series relationship with a relatively large resistance. In the embodiment of FIGURE 1, each of sources 58 and 60 supplies a current $I_2$, each of sources 62 and 64 supplies a current $I_3$ having a sense opposite that of $I_2$ and an intensity greater than that of $I_2$, and source 66 supplies a current $I_1$ having the same sense as $I_2$ and an intensity which may be less than or equal to that of $I_2$. Conductors 50 and 54 cross-couple the two transistor circuits in a manner such as concurrently to maintain one transistor, e.g. transistor 12, conductive and the other transistor, e.g. transistor 14, non-conductive. Under these conditions the current $I_1$ from source 66 flows wholly through transistor 12. As a result the current flowing through load element 30 is substantially equal to the algebraic sum of currents $I_1$, $I_2$ and $I_3$, whereas the current flowing through the load element 36 is substantially equal to the algebraic sum of $I_2$ and $I_3$ alone. When the intensities of $I_1$, $I_2$ and $I_3$ are appropriately related, and equi-valued load resistors 42, 44, 46 and 48 are employed, complementary output voltages are produced at output terminals 68 and 70 respectively. One appropriate relationship between these current intensities is:

$$I_1 = y \text{ (milliamperes)}$$
$$I_2 = I - \tfrac{1}{2}y$$
$$I_3 = I, \text{ where } y \text{ is less than I}$$

To reverse the conduction states of transistors 12 and 14 it is necessary to cut off the initially-conductive transistor and divert the current of source 66 so that it flows through the load element of the initially non-conductive transistor instead of the load element of the initially conductive transistor. In accordance with the invention this result is achieved by a novel switching system which is responsive only to a plurality of concurrent control signals, e.g. two control signals, requires only three transistors and operates substantially more rapidly than prior-art systems employing sequential switching. As shown in FIGURE 1, this switching system comprises three additional transistors 72, 74 and 76 cooperating with current source 66 and serving respectively as first, second and third switching means. Each of these transistors has a base whose conductivity type is the same as that of bases 20 and 26. Switching transistor 72 has its emitter 78 connected to the junction 80 of current source 66 and emitters 16 and 22, and its collector 82 connected to the emitters 84 and 86 of switching transistors 74 and 76 respectively. The collector 88 of switching transistor 74 is connected to the collector 18 of multivibrator transistor 12, and the collector 90 of switching transistor 76 is connected to the collector 24 of multivibrator transistor 14.

To reverse the conduction state of the multivibrator, forward-biasing potentials, i.e. negative potentials, are applied simultaneously to the base 92 of switching transistor 72 and the base of the one of switching transistors 74 and 76 which is connected to the non-conductive one of multivibrator transistors 12 and 14. Thus, assuming that multivibrator transistor 12 initially is conductive and multivibrator transistor 14 initially is non-conductive, the conduction state of the multivibrator is rapidly reversed by applying concurrent negative control voltages to the bases 92 and 94 of transistors 72 and 76 respectively. The application of these voltages causes a potential negative with respect to that of base 20 to be applied to emitter 16 by way of the base-emitter path of transistor 72. As a result transistor 12 is cut off. In addition the application of these voltages causes the current $I_1$ generated by source 66 to be diverted from the emitter-collector circuit of transistor 12 into the load element 36 of transistor 14 by way of the emitter-collector conduction paths of switching transistors 72 and 76. As a result of this diversion a negative voltage is generated at junction 56 and a positive voltage is generated at junction 52. These voltages, applied to bases 26 and 20 respectively by conductors 54 and 50 respectively, turn on transistor 14 and maintain transistor 12 cut off when the forward-biasing voltages are removed from bases 92 and 94. Because the base of the conducting multivibrator transistor is supplied with a potential which differs by only a small amount from reference potential and because the potential of the emitter of this transistor follows closely this base potential, junction 80 always has a potential differing only slightly from reference potential. Accordingly only a relatively small negative voltage need be applied to base 92 to turn on transistor 72. Moreover since emitters 84 and 86 of switching transistors 74 and 76 are connected directly to the collector 82 of transistor 72 either one of transistors 74 and 76 can also be turned on by applying a relatively small negative potential to its base at the same time that a negative potential is applied to base 92. However unless these forward-biasing potentials are applied simultaneously to base 92 and the appropriate one of bases 94 and 96, neither switching transistor is turned on and the conduction state of the multivibrator remains unchanged.

In a typical embodiment, the components of the circuit of FIGURE 1 have the following values:

| | |
|---|---|
| Transistors 12, 14, 72, 74 and 76 | Each a type 2N501 microalloy diffused base transistor. |
| Resistors 42, 44, 46 and 48 | Each 100 ohms. |
| Sources 58, 60 and 66 | Each a 2.7 kilohm resistor connected in series relationship with a plus 22.5 volts source. |
| Sources 62 and 64 | Each a 1.2 kilohm resistor connected in series relationship with a minus 22.5 volts source. |
| Voltage-translating means 32 and 38 | Each a pair of 1N702 Zener diodes connected in series-aiding relationship. |

Such a system can switch at a 60 megacycle rate. It produces complementary output voltages at terminals 68 and 70 having a magnitude of about 0.6 volt. It can be switched by negative control pulses each having an amplitude of 0.6 volt, i.e. it can be driven by a circuit having the same structure as itself whose outputs are connected to bases 94 and 96, and by a source of negative-going clock pulses whose output is connected to base 92.

The current-switching multivibrator embodying my novel switching arrangement may have structures other than that shown in FIGURE 1. Two such specifically different structures are schematically diagrammed in FIGURES 2 and 3. In FIGURE 2 voltage-translating means 32 comprise a pair of Zener diodes 100 and 102 connected in series relationship between collector 88 of switching transistor 74 and terminal 28 of load element 30. Similarly voltage-translating means 38 comprise a pair of Zener diodes 104 and 106 connected in series relationship between collector 90 of switching transistor 76 and terminal 34 of load element 36. Load elements 30 and 36 comprise single resistors. Current sources 58, 60, 62, 64 and 66 respectively comprise relatively high-valued resistors 108, 110, 112, 114 and 116 respectively. Resistors 108, 110 and 116 are supplied with a positive voltage, and resistors 112 and 114 are supplied with a negative voltage. Each of these voltages has the same value V. In the embodiment shown in the drawing, these voltages are supplied by a source 118 comprising batteries 120 and 122 connected in series-aiding relationship and having their common junction 124 connected to the point of reference potential. The positive pole 126 of battery 120 supplies the potential plus V, while the negative pole 128 of battery 122 supplies the potential minus V. To provide a low-impedance return path for alternating currents, batteries 120 and 122 are shunted by bypass capacitors 130 and 132 respectively.

The arrangement of FIGURE 2 differs structurally from that of FIGURE 1 primarily in the connection of the base-emitter path of each multivibrator transistor across the entire load element instead of across only a portion thereof, and in the connection of the collector electrode of each multivibrator transistor to an intermediate-voltage terminal of the voltage-translating means. Thus the base 20 of transistor 12 is connected to terminal 34, and the base 26 of transistor 14 is connected to terminal 28. Accordingly the entire output voltage of each load element of the multivibrator is applied to the base of the transistor connected thereto. This larger voltage drives the transistor to which it is applied more forcefully into or out of conduction, depending on its polarity. However larger potentials must now be applied to the bases of the switching transistors in order to reduce the emitter potential of the initially conductive transistor to a value sufficiently low to cut off that transistor and permit diversion of the current of source 66 into the load of the initially non-conductive transistor.

In addition the collector 18 of transistor 12 is connected to the junction 134 of the anode 136 and cathode 138 of Zener diodes 100 and 102 respectively, and the collector 24 of transistor 14 is connected to the junction 140 of anode 142 and cathode 144 of Zener diodes 104 and 106 respectively. This connection is merely an alternative arrangement for applying anti-saturation potentials to those collectors.

Despite these minor structural variations, the circuit of FIGURE 2 operates in substantially the same manner as that of FIGURE 1. Hence no further discussion of its operation is deemed necesary herein.

In a typical embodiment, the components of the arrangement of FIGURE 2 may have the following values:

| | |
|---|---|
| Transistors 12, 14, 72, 74 and 76 | Each a 2N501 microalloy diffused-base transistor. |
| Zener diodes 100, 102, 104 and 106 | Each a Type 1N702. |
| Resistors 30 and 36 | Each 160 ohms. |
| Resistors 108, 110 and 116 | Each 2.7 kilohms. |
| Resistors 112 and 114 | Each 1.4 kilohms. |
| Batteries 120 and 122 | Each 22.5 volts. |

Where the multivibrator of the invention is employed as an element of a computer, it frequently is necessary to transmit the output signals of the multivibrator to other computer circuits positioned at a considerable distance therefrom. Because the multivibrator operates at high switching rates, generating output signals having numerous high-frequency components, it is necessary to transmit these output signals by means of transmission lines terminated by resistors equal to the characteristic impedance thereof in order to prevent substantial attenuation or distortion of the transmitted signals. Such lines generally have relatively low input impedances, comparable to the values of the multivibrator load resistors. Accordingly when the input terminals of such a line are connected between either of the output terminals 68 and 70 and the point at reference potential see (FIGURES 1 and 2), the load impedance seen by the output circuit of the multivibrator is reduced substantially, and the value of the voltage output produced thereby also is reduced substantially. The arrangement of FIGURE 3 according to the invention avoids this shunting down by employing load elements 30 and 36 as the terminating resistors of transmission lines 150 and 152 rather than as their source resistors, and by employing lines 150 and 152 as the sole loads of the respective collector circuits of the multivibrator transistors.

More particularly, in the embodiments shown in FIGURE 3, transmission line 150 is a coaxial cable having an inner conductor 154 and an outer conductor 156, and transmission line 152 is a coaxial cable having an inner conductor 158 and an outer conductor 160. Inner conductor 154 of cable 150 connects cathode 138 of Zener diode 102 to anode 136 of Zener diode 100, and inner conductor 158 of cable 152 connects cathode 144 of Zener diode 106 to anode 142 of Zener diode 104. The outer conductors 156 and 160 of the cables are connected to the point at reference potential. The load resistors 30 and 36 are connected in series relationship between the cathode 162 and cathode 164 of Zener diodes 100 and 104 respectively, and the junction 40 of these resistors is connected to the point of reference potential. The value of each of resistors 30 and 36 preferably is substantially equal to the characteristic impedance of cables 150 and 152. In practice diodes 100 and 104 and resistors 30, 36, 108 and 110 are positioned adjacent the input terminals of the circuits to be driven by the multivibrator.

To establish the bases 20 and 26 of multivibrator transistors 12 and 14 respectively at appropriate operating potentials, two additional voltage-translating circuits 166 and 168 are provided. Circuit 166 comprises a Zener diode 102 and its cathode connected to the positive pole of battery 120 by way of a resistor 172. Base 26 of transistor 14 is connected to the cathode of Zener diode 170 by conductor 54. Similarly circuit 168 comprises a Zener diode 174 having its anode connected to the cathode of Zener diode 106 and its cathode connected to the positive pole of battery 120 by way of a resistor 176. The cathode of Zener diode 174 is connected by conductor 50 to base 20 of transistor 12.

The operation of the multivibrator of FIGURE 3 is similar to that of the multivibrators of FIGURES 1 and 2 and hence is not discussed in detail. However since load resistors 30 and 36 are employed as the terminating impedances of transmission lines 150 and 152 instead of as their source impedances, the loading experienced by the collector circuit of each multivibrator transistor is substantially equal to the characteristic impedance of the line connected thereto. Hence it is no greater than that experienced by the circuits of FIGURES 1 and 2. Accordingly the multivibrator of FIGURE 3 is able to deliver to its remote load undistorted output voltages having substantially the same amplitudes as those produced by the multivibrators of FIGURES 1 and 2 at their output terminals 68, 70.

In a typical embodiment the components of the circuit of FIGURE 3 have the following values:

| | |
|---|---|
| Transistors 12, 14, 72, 74 and 76 | Each a Type 2N501 microalloy diffused-base transistor. |
| Resistors 30 and 36 | Each between about 100 and 200 ohms, selected to be substantially equal to the characteristic impedances of lines 150 and 152. |
| Zener diodes 100, 102, 104 106, 170 and 174 | Each a Type 1N702. |
| Resistors 108, 110 and 116 | Each 3.8 kilohms. |
| Resistors 112 and 114 | Each 1.5 kilohms. |
| Resistors 172 and 176 | Each 7.5 kilohms. |
| Batteries 120 and 122 | Each 22.5 volts. |

To insure maximum reliability in the operation of the foregoing circuit, it is preferred that the output-voltage characteristics of diodes 170 and 174 be substantially the same.

In a wholly symmetrical arrangement such as that just described, it is feasible to employ a single transmission line (not shown) in place of the two transmission lines 150 and 152. Where this is done the single line preferably has a characteristic impedance equal to the sum of resistances 30 and 36 respectively. For example in place of coaxial lines 150 and 152, a parallel-wire transmission line having an impedance of 300 ohms may be employed. One conductor thereof is connected between cathode 138 of diode 102 and anode 136 of diode 100, and the other conductor thereof is connected between cathode 144 of diode 106 and anode 142 of diode 104. Where such a line is employed, load resistors 30 and 36 preferably have values of 150 ohms each.

FIGURE 4 is a schematic diagram of a two count ring counter employing two multivibrators according to the invention. Each of these multivibrators is identical in structure to the arrangement of FIGURE 1. For convenience in description the upper multivibrmator is designated as "multivibrator A" and the lower multivibrator is designated as "multivibrator B". In addition the reference numerals designating components of multivibrator A are suffixed by "A", and the reference numerals designating components of multivibrator B are suffixed by "B".

To obtain the proper counting action, multivibrators A and B are interconnected as follows: A conductor 200 connects the base 96A of switching transistor 74A to the junction 140B of Zener diodes 104B and 106B. A conductor 202 connects the base 94A of switching transistor 76A to the junction 134B of Zener diodes 100B and 102B. A conductor 204 connects the base 96B of switching transistor 74B to the junction 134A of Zener diodes 100A and 102A, and a conductor 206 connects the base 94B of switching transistor 76B to the junction 140A of Zener diodes 104A and 106A.

To actuate the counter, a source 208 of alternating voltage is provided. The output voltage of source 208 is applied in opposite phases to bases 92A and 92B of switching transistors 72A and 72B respectively by way of a transformer 210. To prevent simultaneous triggering of the two multivibrators by the alternating signal, a reverse-biasing potential is applied to bases 92A and 92B by means of a battery 212 connected to the center tap of the secondary winding 214 of transformer 210. The aforedescribed connections of the bases of the various switching transistors to the junctions of the various Zener diode pairs is employed to apply a bias to each switching transistor appropriate to prevent saturation thereof, as well as to supply the output signals of each multivibrator to the other multivibrator.

The operation of the arrangement of FIGURE 4 is now described by way of an example. Assume that initially transistor 14A of multivibrator A is conductive and transistor 12A thereof is non-conductive, and that transistor 12B of multivibrator B is conductive and transistor 14B thereof is non-conductive. Under these conditions multivibrator A applies a positive potential to base 94B of switching transistor 76B and a negative potential to base 96B of switching transistor 74B. Multivibrator B applies a negative potential to base 96A of switching transistor 74A and a positive potential to base 94A of switching transistor 76A.

When source 208 supplies a negative potential to base 92A of transistor 72A and simultaneously applies a positive potential to base 92B of transistor 72B, the positive potential maintains transistor 92B cut off and multivibrator B quiescent. By contrast the negative potential applied to base 92A tends to drive transistor 72A into conduction. Because the base 96A of transistor 74A already is biased negatively, both transistor 72A and transistor 74A become conductive. As a result transistor 14A is cut off and the current of source 66A is diverted from transistor 14A to load element 30A in the manner already described above with regard to FIGURE 1. As a result a positive output voltage is produced at output terminals 68A and a negative output voltage is produced at output terminal 70A. In addition multivibrator A now supplies a negative voltage to base 94B of switching transistor 76B and a positive voltage to base 96B of switching transistor 74B. Accordingly when voltage source 208 applies a negative potential to base 92B of transistor 72B and a positive potential to base 92A of transistor 72A during the succeeding half cycle of its output voltage, multivibrator A remains quiescent but multivibrator B is actuated into its alternate conduction state. As a result a positive output pulse is produced at output terminal 70B and a negative output pulse is produced at output terminal 68B. In addition a negative potential is applied to base 94A of switching transistor 76A and a positive potential is applied to base 96A of switching transistor 74A, thus conditioning multivibrator A to be actuated into its alternate conduction state by the negative potential applied to base 92A of switching transistor 72A during the succeeding half cycle of the voltage supplied by alternating voltage source 208.

From the foregoing it is seen that the output voltage produced at any one of output terminals 68A, 70A, 68B and 70B switches from one polarity to the opposite polarity and back to the initial polarity in response to every two cycles of alternating voltage generated by source 208. Heretofore the switching system in a two-count ring-counter employing current-switching multivibrators has employed a dozen transistors. In the present arrangement only six switching transistors are required.

The parameter values of the components in each of the two multivibrators may be identical to those already described with regard to FIGURE 1.

The transistors 12, 14, 72, 74 and 76 have been described hereinbefore as having n-type bases. However, transistors having p-type bases may alternatively be employed. In such a case, the senses of the various current sources are reversed and Zener diodes producing voltages of opposite sign are employed.

The current-translating means have been described as comprising Zener diodes. However, batteries or other constant-voltage sources may be used in their stead. Where batteries are so used, current sources 58 and 60 may be removed because batteries unlike Zener diodes do not require an externally supplied unidirectional current to develop an output voltage thereacross.

The switching system of the invention has been described as embodied in current-switching multivibrators of three specific structures. However, the system can also be used in systems employing specifically different current-switching multivibrators.

The switching means in each instance have been described as comprising transistors. However, other switching means, controllable to establish an electrically conductive path between their terminals whose impedance is low compared to that of the current source supplying current to the emitters of the multivibrator transistors, can be substituted therefor. Among these are mechanical switches such as knife, toggle and momentary contact switches, magnetically-actuated relays and thermionic gas tubes.

In the foregoing description, examples have been given setting forth typical parameter values for each embodiment of the invention. It is to be understood that these parameter values are merely exemplary and that the invention is not limited thereto.

While I have described my invention by means of specific examples and in specific embodiments, I do not wish to be limited thereto, for obvious modifications will occur to those skilled in the art without departing from the scope of my invention.

What I claim is:

1. In a current-switching transistor multivibrator comprising first and second transistors each having an emitter, a collector and a base, a constant-current source exhibiting a given resistance between its two terminals and having one of said terminals connected to a point at reference potential and the other of said terminals connected to said emitters of both of said transistors, and means for maintaining one of said transistors substantially non-conductive while the current from said constant-current source flows into said emitter of the other of said transistors; a switching system actuatable to transfer the flow of said current from said emitter of said other transistor to said emitter of said one transistor, said system comprising first, second and third switching means each having two terminals and each controllable to establish between said terminals an electrically conductive path, means connecting one of said terminals of said first switching means to said emitters of both of said transistors, said connecting means having a resistance smaller than said given resistance of said constant-current source, means connecting the other of said terminals of said first switching means to one of said terminals of each of said second and third switching means, means connecting the other of said terminals of said second switching means to collector of said one transistor, and means connecting the other of said terminals of said third switching means to said collector of said other transistor.

2. A multivibrator according to claim 1, wherein said bases of said first and second transistors have the same conductivity type and wherein said constant current source produces a unidirectional current the sense of which is that of the emitter current of either of said transistors when the base-emitter path of the latter transistor is forward-biased.

3. A multivibrator according to claim 1, wherein said first, second and third switching means respectively comprise third, fourth and fifth transistors each having an emitter, a collector and a base, means connecting said emitter of said third transistor to said emitters of both said first and second transistors, said connecting means having a resistance less than said given resistance, means connecting said emitters of said fourth and fifth transistors to said collector of said third transistor, means connecting said collector of said fourth transistor to said collector of said one transistor, and means connecting said collector of said fifth transistor to said collector of said other transistor.

4. A multivibrator according to claim 3, wherein said bases of all of said transistors have the same conductivity type and wherein said constant current source produces a unidirectional current the sense of which is that of the base-emitter current of any of said transistors when the base-emitter path of the latter transistor is forward-biased.

5. In a multivibrator comprising first and second transistors each having an emitter, a collector and a base, said bases being of the same conductivity type, a first load element having one terminal thereof connected directly to a point at reference potential, first voltage-translating means having one terminal thereof connected to another terminal of said first load element, means connecting said collector electrode of said first transistor to another terminal of said first voltage-translating means, a second load element having one terminal thereof connected to said point at reference potential, second voltage-translating means having one terminal thereof connected to another terminal of said second load element, means connecting said collector electrode of said second transistor to another terminal of said second voltage-translating means, means connecting said base of said first transistor to a terminal of said second load element other than said one terminal thereof, means connecting said base of said second transistor to a terminal of said first load element other than said one terminal thereof, first, second, third and fourth sources of unidirectional current each having one terminal connected to said point at reference potential, means connecting the other terminal of said first current source to said other terminal of said first load element, means connecting the other terminal of said second current source to said other terminal of said second load element, means connecting the other terminal of said third current source to a terminal of said first voltage-translating means, and means connecting the other terminal of said fourth current source to a terminal of said second voltage-translating means, and fifth source of unidirectional current exhibiting a given resistance between its two terminals and having one terminal thereof connected to said point at reference potential and the other terminal thereof connected to said emitters of said first and second transistors; a switching system actuatable only by a plurality of control signals to change the conduction state of said multivibrator from its initial state to its alternate state, said system comprising third, fourth and fifth transistors each having an emitter, a collector and a base of the same conductivity type as said bases of said first and second transistors; means connecting said emitter of said third transistor to said emitters of both said first and second transistors, the latter connecting means having a resistance less than said given resistance of said fifth current source, means connecting said collector of said third transistor to said emitters of said fourth and fifth transistors, means connecting said collector of said first transistor to said collector of said fourth transistor, means connecting said collector of said second transistor to said collector of said fifth transistor, and means for applying control signals to said bases of said third, fourth and fifth transistors.

6. A multivibrator according to claim 5, wherein each of said five current sources produces a substantially constant current, wherein said first, second and fifth sources produce currents having the same sense, wherein said third and fourth sources produce currents having a sense opposite the first-named sense, wherein said first and second sources produce currents of substantially equal intensity, wherein said third and fourth sources produce currents of substantially equal intensity, wherein said intensity of said current produced by each of said third and fourth sources exceeds the intensity of said current produced by any other of said sources, wherein the respective senses of said currents is such that when said first transistor is conductive a voltage forward-biasing the base-emitter path of said first transistor when applied to its base is developed across said second load element and a voltage reverse-biasing the base-emitter path of said second transistor when applied to its base is developed across said first load element, and wherein each of said voltage-translating means is poled to apply a reverse-biasing potential to the collector electrodes to which it is connected.

7. A multivibrator according to claim 6, wherein said first voltage-translating means comprising first and second Zener diodes, means connecting the cathode of said first diode to said other terminal of said first current source, means connecting the anode of said first diode to the cathode of said second diode and means connecting the anode of said second diode to said other terminal of said third current source, wherein said second voltage-translating means comprise third and fourth Zener diodes, means connecting the cathode of said third diode to said other terminal of said second current source, means connecting the anode of said third diode to the cathode of said fourth diode and means connecting the anode of said fourth diode to said other terminal of said fourth current source.

References Cited in the file of this patent

UNITED STATES PATENTS 2,831,127 Braicks ---------------- Apr. 15, 1958

OTHER REFERENCES

Yourke: I.R.E. vol. CT–4, No. 3, September 1957, pages 236–240 (page 240 relied on).

I.B.M. Technical Disclosure Bulletin, vol. 2, No. 3, October 1959, pages 70–71 (page 70 relied on).